(12) United States Patent
Hurd

(10) Patent No.: US 9,122,632 B2
(45) Date of Patent: Sep. 1, 2015

(54) PROGRAMMABLE POWER PERFORMANCE OPTIMIZATION FOR GRAPHICS CORES

(75) Inventor: Linda L. Hurd, Cool, CA (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 13/539,414

(22) Filed: Jun. 30, 2012

(65) Prior Publication Data

US 2014/0002467 A1  Jan. 2, 2014

(51) Int. Cl.
*G06F 13/14* (2006.01)
*G09G 5/36* (2006.01)
*G06F 1/32* (2006.01)
*G06F 9/38* (2006.01)

(52) U.S. Cl.
CPC .............. *G06F 13/14* (2013.01); *G06F 1/3206* (2013.01); *G06F 1/3234* (2013.01); *G06F 9/3836* (2013.01); *G09G 5/363* (2013.01); *G09G 2330/021* (2013.01); *G09G 2330/025* (2013.01); *G09G 2340/0435* (2013.01); *G09G 2360/08* (2013.01)

(58) Field of Classification Search
CPC ..... G06F 1/324; G06F 1/3203; G06F 1/3296; G06F 1/3228; G06F 1/3275; G06F 1/3287; G06F 9/30083; G06F 2212/1028
USPC ........................................................ 345/520
See application file for complete search history.

(56) References Cited

U.S. PATENT DOCUMENTS

| | | | |
|---|---|---|---|
| 5,953,020 A | 9/1999 | Wang et al. | |
| 7,337,339 B1 | 2/2008 | Choquette et al. | |
| 7,634,668 B2 * | 12/2009 | White et al. | 713/300 |
| 7,664,971 B2 | 2/2010 | Oh | |
| 7,886,164 B1 * | 2/2011 | Alben et al. | 713/300 |
| 8,193,831 B1 | 6/2012 | Kadosh et al. | |
| 8,214,663 B2 | 7/2012 | Floyd et al. | |
| 8,539,269 B2 | 9/2013 | Rotem et al. | |
| 2001/0011356 A1 | 8/2001 | Lee et al. | |
| 2001/0029556 A1 | 10/2001 | Priem et al. | |
| 2003/0007394 A1 | 1/2003 | Phi et al. | |
| 2007/0206683 A1 | 9/2007 | Lin | |

(Continued)

FOREIGN PATENT DOCUMENTS

WO  2013/101189 A1  7/2013
WO  2013101829 A1   7/2013

OTHER PUBLICATIONS

International Search Report and Written Opinion received for PCT Patent Application No. PCT/US2012/071653 mailed on Apr. 29, 2013, 8 pages.

(Continued)

*Primary Examiner* — Hau Nguyen
(74) *Attorney, Agent, or Firm* — Alpine Technology Law Group LLC

(57) ABSTRACT

Methods and apparatus relating to programmable power performance optimization for graphics cores are described. In one embodiment, the first frame of a scene is analyzed. It is then determined whether to optimize one or more operations, to be performed on one or more frames of the scene, based on the second frame of the scene and an idle status of one or more subsystems of a processor. And, one or more optimization operations are performed on a third frame of the scene based on the determination of whether to optimize the one or more operations. Other embodiments are also disclosed and claimed.

28 Claims, 8 Drawing Sheets

(56) References Cited

U.S. PATENT DOCUMENTS

| | | | |
|---|---|---|---|
| 2008/0235364 | A1 | 9/2008 | Gorbatov et al. |
| 2010/0169692 | A1 | 7/2010 | Burton |
| 2010/0218029 | A1 | 8/2010 | Floyd et al. |
| 2010/0274938 | A1 | 10/2010 | Anand et al. |
| 2011/0022871 | A1 | 1/2011 | Bouvier et al. |
| 2011/0093724 | A1 | 4/2011 | Park et al. |
| 2011/0173477 | A1 | 7/2011 | Asaba |
| 2012/0169746 | A1 | 7/2012 | Samson |
| 2014/0002467 | A1 | 1/2014 | Linda |
| 2014/0092106 | A1 | 4/2014 | Hurd et al. |
| 2014/0245034 | A1 | 8/2014 | Rotem et al. |

OTHER PUBLICATIONS

U.S. Appl. No. 13/539,411, by Linda L. Hurd, filed Jun. 30, 2012, 37 pages.

Non Final Office Action received for U.S Appl. No. 13/340,129, mailed on Dec. 13, 2013, 11 pages.

Non-Final Office Action received for U.S. Appl. No. 13/077,618, mailed on Dec. 26, 2012, 7 pages.

Notice of Allowance received for U.S. Appl. No. 13/077,618, mailed on May 30, 2013, 8 pages.

Non-Final Office Action received for U.S. Appl. No. 13/340,129, mailed on Jun. 5, 2014, 15 pages.

Non-Final Office Action received for U.S. Appl. No. 13/539,411, mailed on Jul. 2, 2014, 19 pages.

International Preliminary Report on Patentability and Written Opinion received for PCT Patent Application No. PCT/US2011/068120, mailed on Jul. 10, 2014, 6 pages.

International Search Report and Written Opinion received for PCT Patent Application No. PCT/US2011/068120, mailed on Sep. 21, 2012, 9 pages.

Final Office Action received for U.S. Appl. No. 13/539,411, mailed on Jan. 15, 2015, 15 pages.

\* cited by examiner

| Bit: | 7 | 6 | 5 | 4 | 3 | 2 | 1 | 0 | |
|---|---|---|---|---|---|---|---|---|---|
| Sub-System State Variables | EU | SAM | L3$ | SC PB | FF 3D | GTI | SC FF | HDC+DAPR | Cdynmax |
| Cdynmax (nF) | 11.9 | 4.71 | 2 | 1.6 | 0.9 | 0.8 | 0.6 | 0.3 | 22.806 |

State Examples:

| | | | | | | | | | |
|---|---|---|---|---|---|---|---|---|---|
| Idle = 00h | 0 | 0 | 0 | 0 | 0 | 0 | 0 | 0 | 0 |
| All Subsystems except Sampler Active = BFh = 190 | 1 | 0 | 1 | 1 | 1 | 1 | 1 | 1 | 18.1 |
| All Subsystems Active = FFh | 1 | 1 | 1 | 1 | 1 | 1 | 1 | 1 | 22.8 <== highest value of Cdyn_max |

FIG. 4

PROGRAMMABLE POWER PERFORMANCE OPTIMIZATION FOR GRAPHICS CORES

FIELD

The present disclosure generally relates to the field of electronics. More particularly, an embodiment of the invention relates to programmable power performance optimization for graphics cores.

BACKGROUND

Generally, the maximum operating current budget of a device (such as a CPU (Central Processing Unit)) is determined by the worse case workload that the device may handle at any time, sometimes referred to as "power virus". Without a protection mechanism, this maximum current may negatively impact chip, package, and system power delivery design.

For example, modern CPU and GPU (Graphics Processing Unit) architectures may implement new functional blocks such as vector operation or accelerator hardware that increase the dynamic range of the power/current and allow much higher power and current "power viruses". This increased "power virus" current may have a severe impact on the design due to a need for higher voltage to compensate for the I*R (where "I" stands for current and "R" stands for resistance) droop which may in turn cause waste of power (i.e., power consumption increases as the voltage guard-bands increase).

There may also be a negative impact on reliability (i.e., the need for higher voltage to compensate for the I*R droop increases voltage levels and reduces device life). Lower turbo frequency may be achieved since the highest operation point (e.g., when all cores in a processor are working) is determined by the maximum current needed for worse current "power virus". Further, package and power delivery costs may be increased because additional capacitors and better voltage regulators may be needed to supply the higher current. Additionally, the system power delivery capabilities may need to be increased in other components such as the battery and/or a power supply.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 4 illustrates a sample table with capacitance values for various subsystems status states, according to an embodiment.

DETAILED DESCRIPTION

Figure 1:
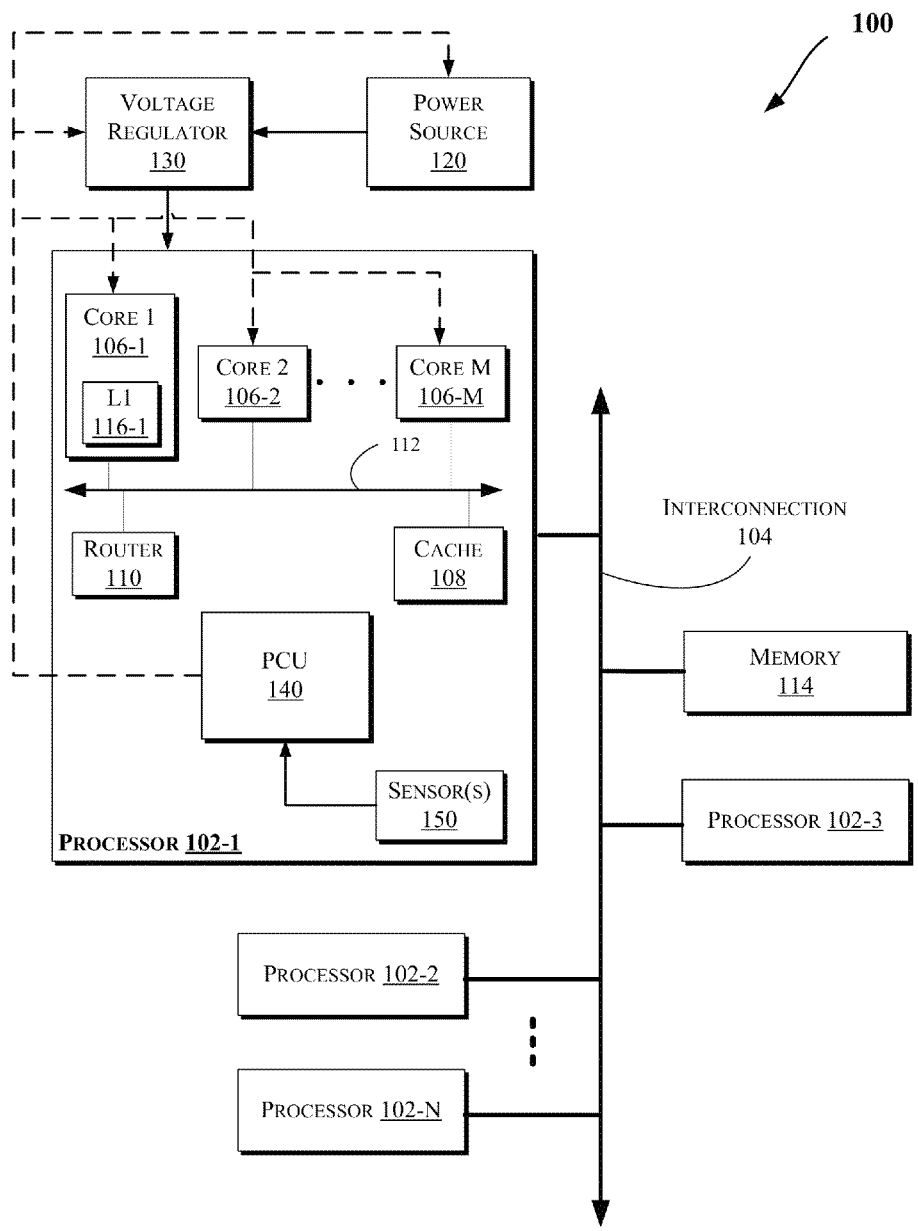
FIGS. 1, 8, and 9 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As processor die (e.g., including both a general-purpose CPU and a GPU) become larger (e.g., to include more functionality such as processing power, storage, etc.), more product SKUs (Stock Keeping Units) may become maximum operating current (Icc_max) limited during different turbo scenarios compared to previous designs, for example, depending on workload characteristics (and how those workloads are dynamically partitioned across multiple CPU cores and/or GPU cores) in those timeframes. Generally, a turbo operation (also referred to as turbo boost) allows processor core(s) to run faster than the base operating frequency (for a period of time) if they are operating below power, current, and temperature specification limits.

Some of the embodiments discussed herein may provide efficient and/or flexible power management for computing systems and/or processors, e.g., via a dynamically configurable graphics logic to optimize/maximize graphics (and/or general-purpose) processor core performance for given workload characteristics, workload partitioning, electrical parametrics of the SKU, and/or the environmental conditions of the die (e.g., based on information detected by one or more sensors).

Graphics processor core architecture, in comparison to general-purpose processor core architecture, can be complex. The complexity is in part due to a range of reasons including: different subsystems, latencies, and interactions between these subsystems as well as the general-purpose processor core, ring, LLC (Last Level Cache), external memory, etc. More particularly, the graphics processor core may be viewed as a non-linear dynamic system. The subsystems may each be treated as state variables. In this non-linear dynamic system, turbo-ing to higher frequency to increase performance may be viewed as a sympathetic force and throttling to lower frequency due to power budget limitation, thermal limitation, package Icc_max limitation, etc. may be viewed as parasympathetic force. For example, in one embodiment, a graphics processor core is logically divided into subsystems, and then modeled as a dynamic non-linear system in order to determine the best configuration of graphics to optimize performance of the workload under a set of electrical parametric conditions, environmental conditions, and imposed SKU Limits.

An embodiment allows for potential performance improvement (such as frequency bin gain) for GPU (or Graphic Effect (GFX)) turbo and/or CPU turbo (e.g., when GFX is active) operations in SKUs which are package Icc_max (maximum operating current) limited. Generally, a turbo operation allows processor core(s) to run faster than the base operating frequency (for a period of time) if they are operating below power, current, and temperature specification limits. In one embodiment, the package Icc_max budget may be intelligently allocated and/or utilized by treating graphics maximum dynamic capacitance (Cdyn_max) as being variable in a dynamic sense, e.g., based on analysis of workload such as one or more frames of a scene. This in turn allows for opportunistically improving performance. The scene may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene may be designed/generated on a computer in some embodiments. Also, one or more of the frames of the scene may be presented via a display (such as the display discussed with reference to FIGS. 8 and/or 9, including for example a flat panel display device, etc.).

Moreover, some embodiments may be applied in computing systems that include one or more processors (e.g., with one or more processor cores), such as those discussed with reference to FIGS. 1-9, including for example mobile computing devices such as smart phones, tablets, portable game consoles, etc.). More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 8-9), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores). Power source may be capable of driving variable voltage or have different power drive configurations.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to components of the processor 102 (e.g., cores 106). Logic 140 may have access to one or more storage devices discussed herein (such as cache 108, L1 cache 116, memory 114, register(s), or another memory in system 100) to store information relating to operations of the PCU logic 140 such as information communicated with various components of system 100 as discussed here.

As shown, the logic 140 may be coupled to the VR 130 and/or other components of system 100 such as the cores 106 and/or the power source 120. For example, the PCU logic 140 may be coupled to receive information (e.g., in the form of one or more bits or signals) to indicate status of one or more sensors 150 (where the sensor(s) 150 may be located proximate to components of system 100 (or other computing systems discussed herein such as those discussed with reference to other figures including 8 and 9, for example), such as the cores 106, interconnections 104 or 112, etc., to sense variations in various factors affecting power/thermal behavior of the system, such as temperature, operating frequency, operating voltage, operating current, dynamic capacitance, power consumption, inter-core communication activity, etc.).

For example, the sensors 150 may detect whether one or more subsystems are active (e.g., as discussed with reference to FIGS. 2-7). The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, dynamic capacitance, operating current, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Also, even though cores 106 are shown to be processor cores, these can be other computational element such as graphics cores, special function devices, etc.

In some current implementations, graphics $Cdyn\_max$ definition may be generally based on a maximum sustainable Cdyn (dynamic capacitance) across a defined window (such as, 1 μsec). The dynamic component of Icc_max is Cdyn_max*V*F (where "V" stands for voltage, and "F" stands for frequency). Further, graphics Cdyn_max may be treated as a constant value independent of workload, for example, the highest average Cdyn that can be sustained across a 1 μsec time window.

Moreover, Cdyn_max terminology originated from general-purpose CPU core world which is an architecture/machine capable of sustaining the Cdyn_max over a long period of time. However, GPU architecture is relatively more complex; namely, the max sustainable Cdyn for 1 μsec may be a different value than that for 100 μsec or 2 μsec based on the complexity of the different subsystems, latencies, and interactions between these subsystems in the GPU core, for example.

In some embodiments, Cdyn_max is not a static constant and is variable/dynamic for most graphics frames. This is because different drawcalls may take different paths through the graphics engine. For example, a drawcall performing vertex shading that does not use sampler takes a different path than a drawcall performing a pixel shader which does use sampler. Generally, a sampler (also known as "3D Texture Sampler" sometimes) refers to logic for performing texture filtering (or smoothing) to determine the texture color for a texture-mapped-pixel using the colors of nearby texls (pixels of the texture). The texturing process allows a texture to be applied at many different shapes, sizes, and angles, while minimizing blurriness, shimmering and blocking. Another example is a GPU workload, which does not utilize the sampler, does not have potential for as high of a Cdyn_max as one that does. An embodiment, leverages off of the variable Cdyn_max observation for opportunistically improving performance for SKUs which have Icc_max limitation, by intelligently enabling gain of frequency bin(s) during turbo operation when such opportunity exists, e.g., based on the analysis of one or more frames in a scene. By contrast, the package Icc_max is a fixed value for a SKU in current implementations.

Figure 2:
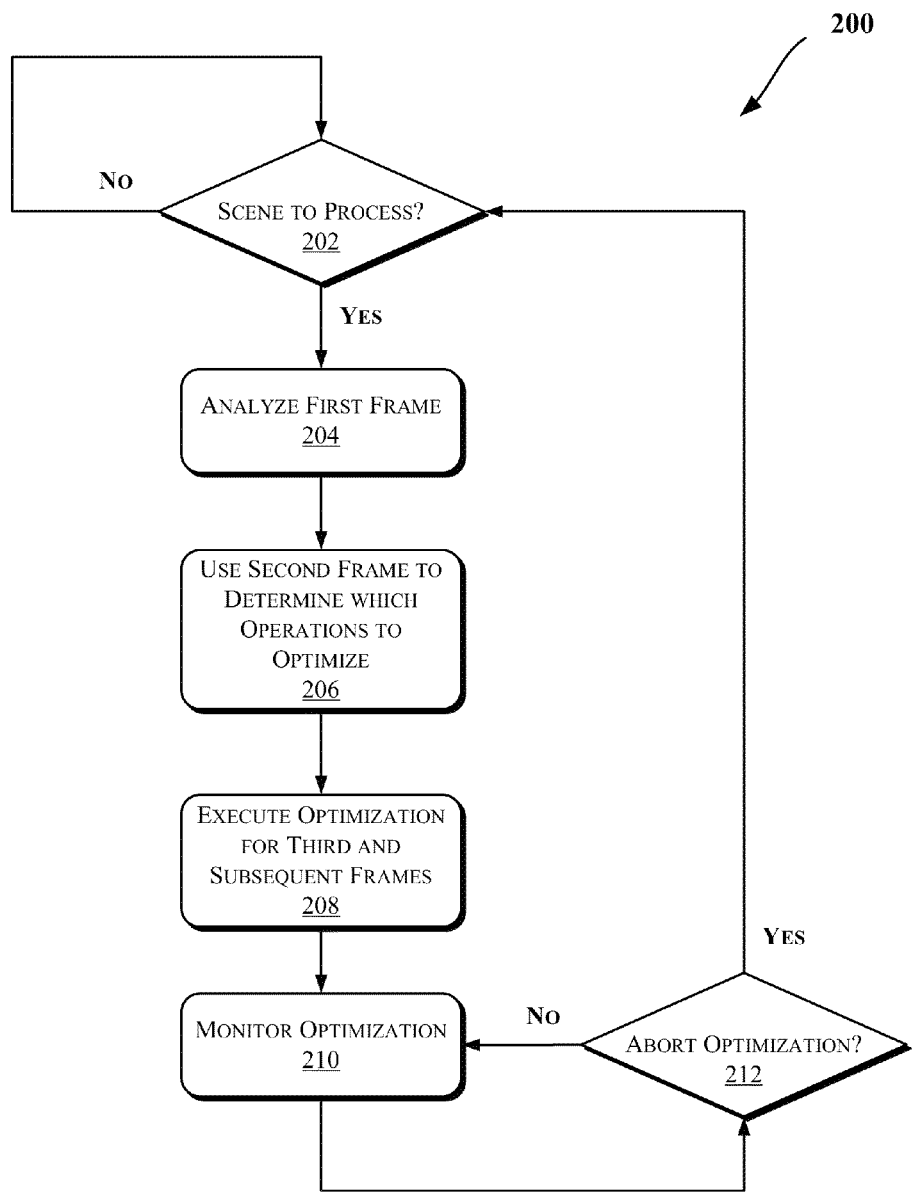
FIG. 2 illustrates a flow diagram of a method to provide programmable power performance optimization for graphics cores, according to an embodiment.

FIG. 2 illustrates a flow diagram of a method 200 to provide programmable power performance optimization for graphics cores, according to an embodiment. In some embodiments, various components discussed with reference to FIGS. 1 and 8-9 may be utilized to perform one or more of the operations discussed with reference to FIG. 2.

In some embodiments, a full frame may be modeled as a state diagram with state transition probabilities (e.g., based on a Markov model, observed and unobserved processes) and state transition path at a coarse-level to use for learning/training. Most scenes tend to have a high degree of correlation from one frame to the next. Once a scene is detected for processing (operation 202), the first frame in a scene may be used to perform analysis, e.g., gathering information and computing state transition probabilities, at an operation 204. At an operation 206, the second frame may be used to perform the optimization calculations, e.g., to determine which drawcalls of one or more frames of the scene receive which type of optimization (or no optimization because they may be too short or have no opportunity). In an embodiment, a "marker system" may be used to mark which drawcalls receive an optimization (for example, operating frequency change, power-gating of a subsystem, disabling of co-issue, etc.). The marking may be done in various ways, such as including one or more bits with a drawcall or build a table which includes each drawcall and an associated bit indicating the marking. The marking information may be stored in a storage device, such as those discussed with reference to FIGS. 1, 8, and/or 9.

At an operation 208, in the third and subsequent frames of the scene, the optimizations may be executed.

In an embodiment, at operation 210, some failsafe monitoring may be done to detect when to abort executing optimizations at operation 212 (e.g., due to drop in expected correlation of present frame to previous frame) and return to baseline maximum value of Cdyn_max (and Voltage, Frequency pair) for remainder of the frame. In various embodiments, one or more of the operations 202-212 may be performed by logic in a computing system (such as logic 140 of FIG. 1). Also, operations 202-212 may be performed for each scene.

Moreover, the parametrics for graphics (such as leakage versus voltage and/or leakage versus temperature lookup tables) and same types of parametrics for the rest of die may be caused to be stored by hardware or software, or combinations thereof. Values associated with the Cdyn_max contribution per graphics subsystem may also be stored.

In some embodiments, for Graphics Core, subsystems may be defined as one or more of: (1) GTI (which, as discussed herein, may refer to Graphics Transfer Interface, Graphics Transmission Interface, or Global Transfer Interface interchangeably); (2) one or more Fixed Functions (also referred to as "FF" herein, such as CS (Command Streamer), VF (Vertex Fetch), VS (Vertex Shader), GS (Geometry Shader), TE (Tesselator), DS (Domain Shader), HS (Hull Shader), SOL (Stream Out), CL (Clipper), SF (Setup (aka, Strip and Fan)), TDG (Thread Dispatcher Global), VFE (Video Front End), and/or TSG (Thread Spawner Global)); (3) Slice Common (SC) front end (e.g., including WM (Window Manager), IZ (Intermediate Z), HZ (High Z), SBE (Setup Back End), STC (Stencil Cache), RCZ (Render Cache Z)) complex of unit(s); (4) SC back end (e.g., including RCC (Render Cache Color), DAPR BE (Data Port Back End), MSC (Multi Sample Cache), RCPBFE (Front End of Render Color-Pixel Blend), RCPBBE (Back End of Render Color-Pixel Blend), IECP (Image Enhancement Color Processing (Media)) complex of Unit(s); (5) L3$ (Third Level cache); (6) EUs (Execution Units), L1 Instruction Cache(s), Message Arbiter, Thread Dispatcher Local, Pixel Shader Dispatcher, and/or BariCentric unit(s); (7) one or more Samplers (also referred to herein as "SAM"); and/or (8) HDC (Half-slice Data Cluster) plus DAPRFE (Front End of the Data Port). When any of these is active, each contribute unique values of Cdyn_max to the total Cdyn_max.

Figure 3:
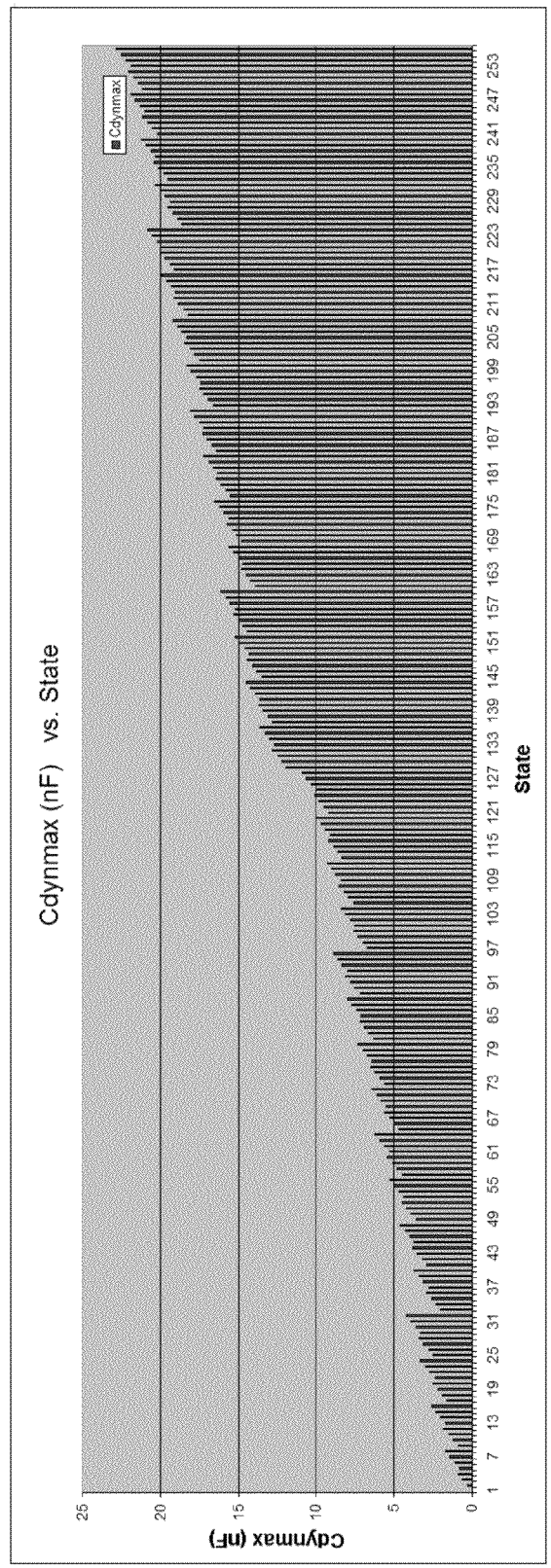
FIGS. 3 and 7 illustrate bar graphs of sample continuums of capacitance values, according to some embodiments.

FIG. 3 illustrates a bar graph of a sample continuum of Cdyn_max values for the 256 possible combinations, according to an embodiment. FIG. 4 illustrates a sample table with Cdyn_max values for various subsystems status states, according to an embodiment.

As discussed herein, the state variable is 0 if the subsystem is idle and 1 if the Subsystem is Active (where Active refers to Active Not Stalled plus Active Stalled in an embodiment). Of course, the 0/1 designation may be reversed depending on the implementation. The nonlinear dynamic system has 256 unique states. Each of these states has an associated Cdyn_max value (based upon a time window definition). There may be more than one time window definition. In an embodiment, each time window definition may have an associated Cdyn_max. Also, for a given frame, not all 256 possible states may occur. In Symbolic Dynamics (e.g., based on Shannon Entropy), those states which do not occur are called Forbidden Words (where "Words" is a term for States). Symbolic Dynamics may be multi-dimensional in some embodiments.

Figure 5:
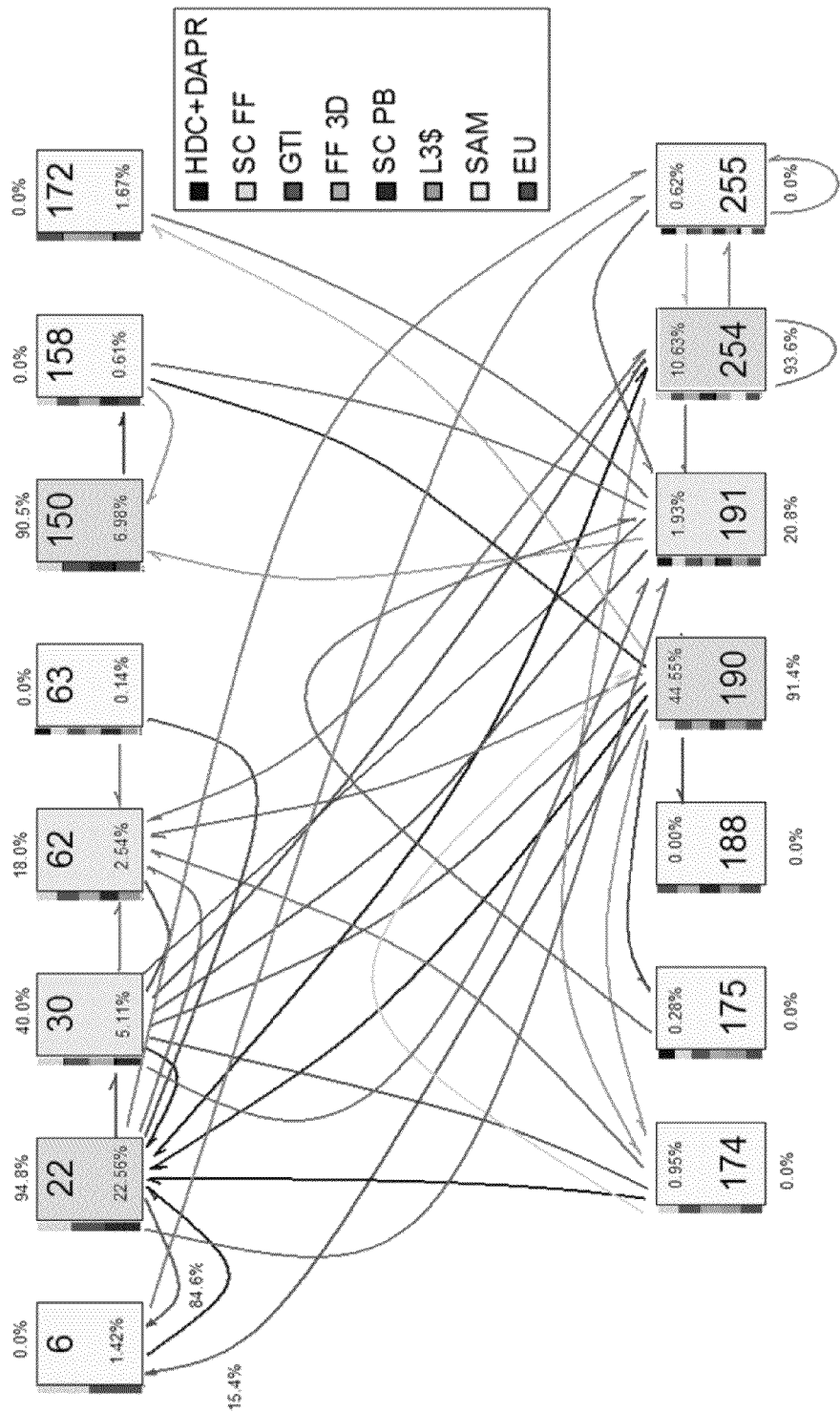
FIG. 5 illustrates a state diagram associated with an image frame, according to an embodiment.

FIG. 5 illustrates a state diagram associated with an image frame, according to an embodiment. In FIG. 5, the large numbers in boxes indicate the decimal value of the state (for example, 255=1111 1111=FF in hex), percentage values in boxes indicate percentage of the frame that the state occurs (for example, state 255 occurs only 0.6% of the frame), percentage values adjacent to each box indicate once the state is entered (within that state) the probability that it will remain in that state (for example, state 255 is 0%, indicating that when the frame enters that state it never remains there), and little boxes adjacent to each large box indicate active status of subsystems shown in the legend and discussed above.

As shown in FIG. 5 and discussed with reference to FIGS. 2-4, based on the above definitions, a workload (for example, a drawcall or a full frame) may be modeled as a state diagram with state transition probabilities (e.g., Bayesian model or Markov model) and a state transition path at a coarse-level to use for learning/training. This may in turn detect which states never occur and which states occur most frequently for optimization (e.g., see sample percentages in FIG. 5), in turn detecting hidden processes/patterns that would otherwise be difficult to detect.

For a high complexity realization, additional forward looking/predictive analysis may be done to make further optimizations for graphics only or for graphics and/or general-purpose processor core operations. Also, the order in which the work is done to process the frame may be arranged. Further, another level of coarse graining could be done to further simplify the optimization steps. In multi-dimensional Symbolic Dynamics, instead of allowable states and state transitions, there may be allowable patterns (arrays) and pattern transitions to analyze and optimize. Also, analysis and/or optimization may be done on how to dynamically change the partitioning of the workload across graphics and general-purpose processor core(s) to opportunistically take advantage of thermal time constants. One may visualize a thermal wave dynamically propagating back and forth across the die, for example. In an embodiment, logic 140 may determine optimization with highest gain for the given workload and environmental conditions (e.g., based on information detected by the one or more sensors 150).

Moreover, most scenes of 3D (three dimensional) workloads contain a high degree of correlation from one frame to the next. As previously mentioned, the first frame in a scene would be used to gather the information, e.g., compute state transition probabilities. The second frame could be used to execute the optimization techniques to determine which drawcalls or sections of frame receive which type or optimization (or no optimization, for example, because they may be too short or have no opportunity), and decide what configuration of graphics is most optimal given the conditions (e.g., based on V, F, temperature, Power Budget, Power being dissipated by rest of chip, etc., e.g., as detected by the sensor(s) 150) at the time. In the third and subsequent frames of the scene, the optimizations may be executed. Some continual failsafe monitoring may need to be done to detect when it may be necessary to abort executing optimizations (due to drop in expected correlation of present frame to previous frame) and return to baseline settings for remainder of frame. The first frame of each scene and the final frame of each scene may be communicated to logic (e.g., logic 140) for processing/analysis.

Workloads may also have correlation across a plurality (or all) of the scenes, leaving behind signatures which reflect characteristics of the game developer's style, for example. In an embodiment, logic (e.g., logic 140) has the ability to detect this correlation across scenes, and then leverages from the knowledge to optimize the performance on future scenes in the workload opportunistically.

In some embodiments, examples of possible optimizations include (where each of these may be used in conjunction with DIAUPIB (referring to the Dynamic Intelligent Allocation and Utilization of Package Maximum Operating Current Budget) and power gating in various embodiments): (a) selective disabling of EUs; (b) selective disabling of concurrent instruction issue depending on instruction mix of shaders in workload; (c) selective disabling of co-issue ("co-issue" generally refers to one of the a plurality of FPUs (Floating Point Units) instructions which may also be issued (or "co=issued") to the MathBox Pipe (a.k.a., Extended Math Pipe) within the EUs); (d) selective disabling of fast pixel mode(s) in sampler; (e) limiting the number of L3$ cache bank accesses across a window of time (also referred to as bank access density); (f) for drawcalls with low sampler Utilization, disable one or more sampler per slice (i.e. allow the EUs in two half-slices to only use one sampler); and/or (g) only using half of backend of the processor core pipeline (e.g., where the "Pixel Backend" includes the following: DAP (Data Port) Slice Common, RCPBFE unit, RCPBE unit, RCC (Render Color Cache) unit, and MSC (another cache) unit) when possible.

An example of a simple optimization is when with baseline settings, a frame requires 50 Million render clocks to process and it may run at Fcr=500 MHz (where Fcr stands for render clock frequency, where the render clock is the main clock in the Graphics logic in an embodiment). At Fcr=550 MHz, graphics would exceed power budget limit. However, the following change allows graphics to turbo to 550 MHz and increase frame rate by 5%: disabling of co-issue in part of the frame, increases the number of render clock to process the frame by 5% and lowers the average Cdyn enough that the frame may run at 1.05 GHz without exceeding the power budget limit. The increase from 500 MHz to 550 MHz represents a 10% improvement. Then, the net improvement is 5% (i.e., 5%=10%-5%) in an embodiment.

A second example of an optimization is when graphics is package Icc_max limited. Because of the low utilization of the L3$ in this workload, the optimization analysis indicates that allowing for a maximum of 2 L3$ banks to be accessed in any given cycle will increase the number of render clocks to process frame by less than 0.5% and the reduction in graphics Cdyn_max of 2 nF allows Graphics to gain 1 bin of frequency which translates to 5%. The net performance improvement would be 4.5% (i.e., 5%-4.5%) in an embodiment.

In some embodiments, to support analysis, one or more of the following may be used: (1) activity events from the various subsystems are sent routed to a logic (e.g., logic 140) as input to the optimization calculations; (2) a coarse-level Cdyn model is executed to estimate graphics power; (3) temperature input (e.g., via sensor(s) 150) may be provided to the analysis from each of the remote sensor(s) (such as diodes); (4) interaction with the PCU would be needed, as well as possibly inputs from general-purpose cores and other components; (5) the parametrics for graphics (such as leakage versus voltage, leakage versus temperature Lookup tables) and same types of parametrics for rest of die may be stored via software, hardware, or combinations thereof; (6) the Cdyn_max contribution per graphics subsystem is stored; and/or (7) markers may be used to designate drawcalls (or other measure of sub-frame activity) at which optimizations would be implemented at specific locations in subsequent frames.

In an embodiment (e.g., a medium complexity form), the realization may be a state machine with interface logic. In another embodiment (e.g., a more complex form), the realization may be a microcontroller with some memory (e.g., such as the memories discussed with reference to FIG. 8 or 9) and other interface logic. Moreover, an advantage to a programmable solution is that as new optimization ideas come about, they may more easily be implemented. Also, optimization logic/techniques may easily be honed in post-silicon. Further, embodiments discussed herein may be extended to the full Integrated Circuit (IC) die (e.g., state variables for all major full die subsystems).

Figures 6, 7:
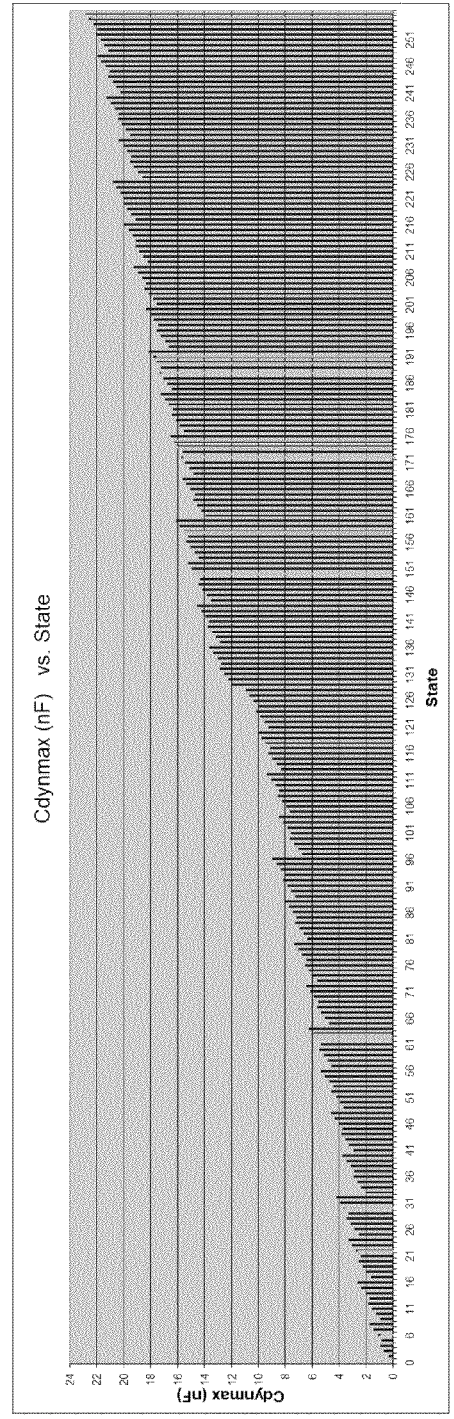
FIG. 6 illustrates a state transition table for a sample frame, according to an embodiment.

FIG. 6 illustrates a state transition table for a sample frame, according to an embodiment. FIG. 7 illustrates a bar graph of a sample continuum of capacitance values for the 256 possible combinations, according to an embodiment. The bar graph of FIG. 7 illustrates values corresponding to the state transition table of FIG. 6.

Figure 8:
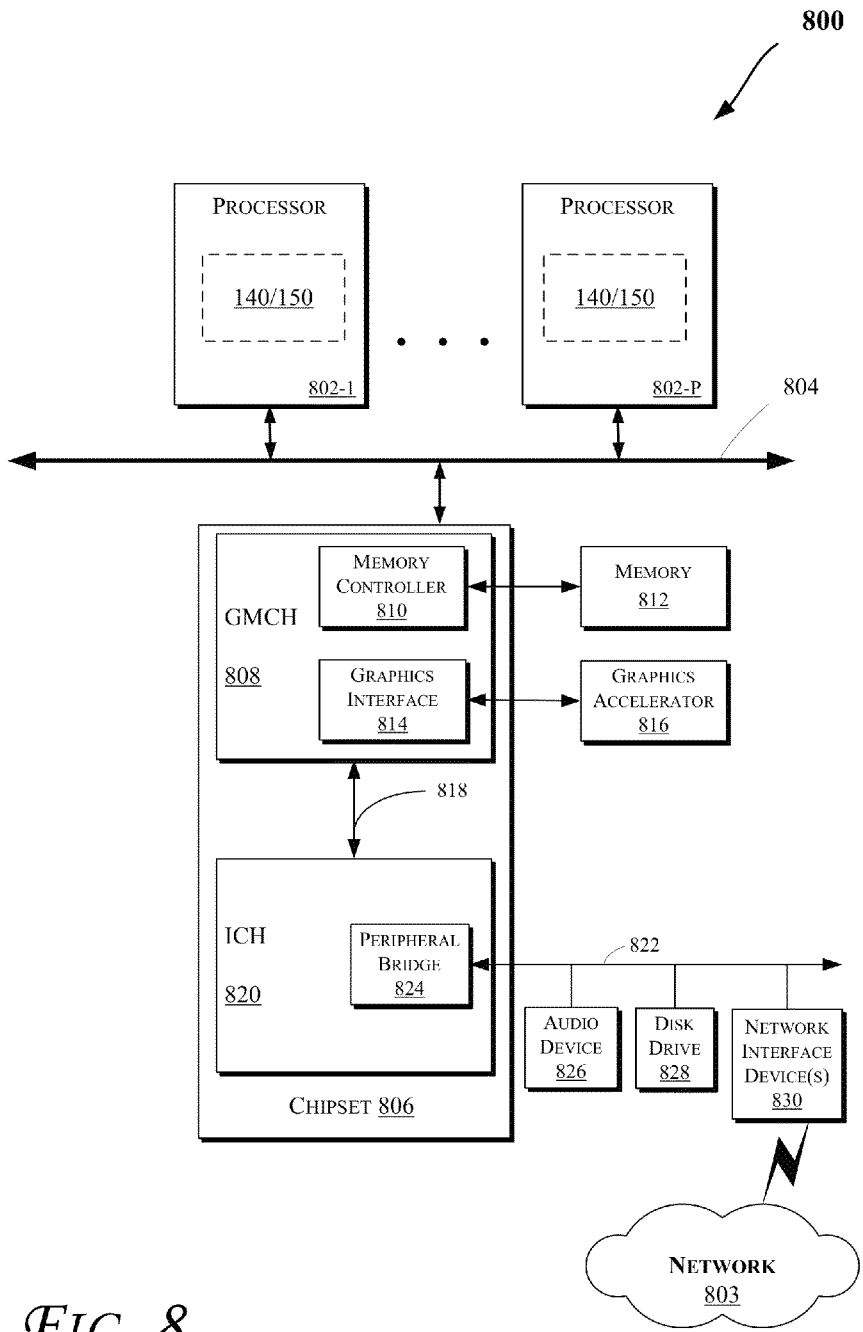

FIG. 8 illustrates a block diagram of a computing system 800 in accordance with an embodiment of the invention. The computing system 800 may include one or more central processing unit(s) (CPUs) or processors 802-1 through 802-P (which may be referred to herein as "processors 802" or "processor 802"). The processors 802 may communicate via an interconnection network (or bus) 804. The processors 802 may include a general purpose processor, a network processor (that processes data communicated over a computer network 803), or other types of a processor (including a reduced instruction set computer (RISC) processor or a complex instruction set computer (CISC)). Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors. In an embodiment, one or more of the processors 802 may be the same or similar to the processors 102 of FIG. 1. In some embodiments, one or more of the processors 802 may include one or more of the cores 106, logic 140, sensor(s) 150, of FIG. 1. Also, the operations discussed with reference to FIGS. 1-7 may be performed by one or more components of the system 800. For example, a voltage regulator (such as VR 130 of FIG. 1) may regulate voltage supplied to one or more components of FIG. 8 at the direction of logic 140.

A chipset 806 may also communicate with the interconnection network 804. The chipset 806 may include a graphics and memory control hub (GMCH) 808. The GMCH 808 may include a memory controller 810 that communicates with a memory 812. The memory 812 may store data, including sequences of instructions that are executed by the processor 802, or any other device included in the computing system 800. In one embodiment of the invention, the memory 812 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 804, such as multiple CPUs and/or multiple system memories.

The GMCH 808 may also include a graphics interface 814 that communicates with a graphics accelerator 816. In one embodiment of the invention, the graphics interface 814 may communicate with the graphics accelerator 816 via an accelerated graphics port (AGP). In an embodiment of the invention, a display (such as a flat panel display, a cathode ray tube (CRT), a projection screen, etc.) may communicate with the graphics interface 814 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 818 may allow the GMCH 808 and an input/output control hub (ICH) 820 to communicate. The ICH 820 may provide an interface to I/O devices that communicate with the computing system 800. The ICH 820 may communicate with a bus 822 through a peripheral bridge (or controller) 824, such as a peripheral component interconnect (PCI) bridge, a universal serial bus (USB) controller, or other types of peripheral bridges or controllers. The bridge 824 may provide a data path between the processor 802 and peripheral devices. Other types of topologies may be utilized. Also, multiple buses may communicate with the ICH 820, e.g., through multiple bridges or controllers. Moreover, other peripherals in communication with the ICH 820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 822 may communicate with an audio device 826, one or more disk drive(s) 828, and one or more network interface device(s) 830 (which is in communication with the computer network 803). Other devices may communicate via the bus 822. Also, various components (such as the network interface device 830) may communicate with the GMCH 808 in some embodiments of the invention. In addition, the processor 802 and the GMCH 808 may be combined to form a single chip. Furthermore, the graphics accelerator 816 may be included within the GMCH 808 in other embodiments of the invention.

Furthermore, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 800 may be arranged in a point-to-point (PtP) configuration. For example, processors, memory, and/or input/output devices may be interconnected by a number of point-to-point interfaces.

Figure 9:
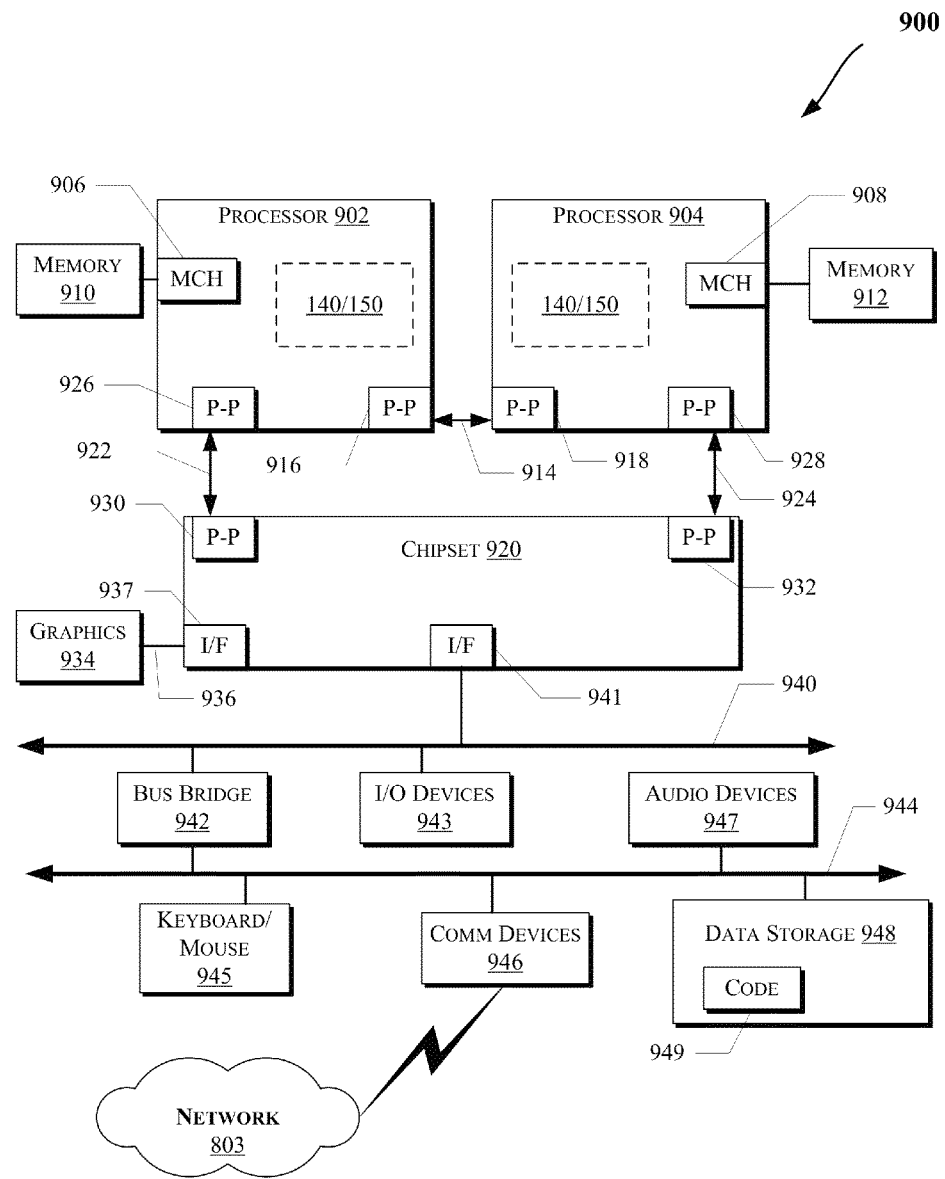

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-8 may be performed by one or more components of the system 900. For example, a voltage regulator (such as VR 130 of FIG. 1) may regulate voltage supplied to one or more components of FIG. 9.

As illustrated in FIG. 9, the system 900 may include several processors, of which only two, processors 902 and 904 are shown for clarity. The processors 902 and 904 may each include a local memory controller hub (MCH) 906 and 908 to enable communication with memories 910 and 912. The memories 910 and/or 912 may store various data such as those discussed with reference to the memory 812 of FIG. 8. Also, the processors 902 and 904 may include one or more of the cores 106, logic 140, and/or sensor(s) 150 of FIG. 1.

In an embodiment, the processors 902 and 904 may be one of the processors 802 discussed with reference to FIG. 8. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

In at least one embodiment, one or more operations discussed with reference to FIGS. 1-9 may be performed by the processors 902 or 904 and/or other components of the system 900 such as those communicating via a bus 940. Other embodiments of the invention, however, may exist in other circuits, logic units, or devices within the system 900 of FIG. 9. Furthermore, some embodiments of the invention may be distributed throughout several circuits, logic units, or devices illustrated in FIG. 9.

Chipset 920 may communicate with the bus 940 using a PtP interface circuit 941. The bus 940 may have one or more devices that communicate with it, such as a bus bridge 942 and I/O devices 943. Via a bus 944, the bus bridge 942 may communicate with other devices such as a keyboard/mouse 945, communication devices 946 (such as modems, network interface devices, or other communication devices that may communicate with the computer network 803), audio I/O device, and/or a data storage device 948. The data storage device 948 may store code 949 that may be executed by the processors 902 and/or 904.

In various embodiments of the invention, the operations discussed herein, e.g., with reference to FIGS. 1-9, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-9.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
logic to analyze a first frame of a scene;
logic to determine whether to perform one or more operations on one or more frames of the scene based on a second frame of the scene and an idle status of one or more subsystems of the processor; and
logic to execute the one or more operations on a third frame of the scene based on a determination by the logic to determine whether to perform the one or more operations, wherein the logic to determine whether to perform the one or more operations is to determine which drawcalls are to receive one or more types of modification based on a marker, wherein the one or more types of modification is to comprise one or more of: power-gating of the one or more subsystems or disabling of co-issue.

2. The processor of claim 1, wherein logic to analyze the first frame of the scene is to gather information and compute state transition probabilities corresponding to the first frame.

3. The processor of claim 1, further comprising logic to determine whether to abort execution of the one or more operations in response to a drop in correlation of a present frame of the scene to a previous frame of the scene.

4. The processor of claim 1, wherein the logic to execute is to execute the one or more operations on a subsequent frame, following the third frame, of the scene.

5. The processor of claim 1, wherein the one or more subsystems are selected from one or more of: Graphics Transmission Interface (GTI), one or more Fixed Functions, Slice Common (SC) front end, SC back end, Third Level cache, one or more Samplers, or Half-slice Data Cluster plus Front End of the Data Port.

6. The processor of claim 1, wherein the determination is to be based on information from one or more sensors.

7. The processor of claim 1, comprising one or more processor cores to perform graphics or general-purpose computational operations.

8. The processor of claim 1, further comprising one or more sensors to detect variations, corresponding to components of the processor, in one or more of: temperature, operating frequency, operating voltage, operating current, dynamic capacitance, power consumption, or inter-core communication activity.

9. The processor of claim 1, wherein one or more of a plurality of computational elements, a voltage regulator, the logic to analyze, the logic to determine, the logic to execute, or a memory are on a single integrated circuit die.

10. The processor of claim 1, wherein the one or more subsystems are to include one or more Execution Units.

11. A method comprising:
analyzing a first frame of a scene;
determining whether to perform one or more operations on one or more frames of the scene based on a second frame of the scene and an idle status of one or more subsystems of a processor;
executing the one or more operations on a third frame of the scene based on the determination of whether to perform the one or more operations; and
determining which drawcalls receive one or more types of modification, wherein the one or more types of modification comprises one or more of: power-gating of the one or more subsystems or disabling of co-issue.

12. The method of claim 11, further comprising gathering information and computing state transition probabilities corresponding to the first frame.

13. The method of claim 11, further comprising determining whether to abort execution of the one or more operations in response to a drop in correlation of a present frame of the scene to a previous frame of the scene.

14. The method of claim 11, wherein the one or more types of modification comprises one or more of an operating frequency change, the power-gating of the one or more subsystems, or the disabling of co-issue.

15. The method of claim 11, further comprising executing the one or more operations on a subsequent frame, following the third frame, of the scene.

16. The method of claim 11, wherein the one or more subsystems are selected from one or more of: Graphics Transmission Interface (GTI), one or more Fixed Functions, Slice Common (SC) front end, SC back end, Third Level cache, one or more Samplers, or Half-slice Data Cluster plus Front End of the Data Port.

17. The method of claim 11, further comprising detecting variations, corresponding to components of the processor, in one or more of: temperature, operating frequency, operating voltage, operating current, dynamic capacitance, power consumption, or inter-core communication activity.

18. The method of claim 11, wherein the one or more subsystems are to include one or more Execution Units.

19. A system comprising:
a processor having one or more processor cores;
memory to store data to be accessed by at least one of the one or more processor cores;
a display device to present at least one frame of a scene;
the processor comprising:
logic to analyze a first frame of the scene;
logic to determine whether to perform one or more operations on one or more frames of the scene, based on a second frame of the scene and an idle status of one or more subsystems of the processor; and
logic to execute the one or more operations on a third frame of the scene based on a determination by the logic to determine whether to perform the one or more operations, wherein the logic to determine whether to perform the one or more operations is to determine which drawcalls are to receive one or more types of modification, wherein the one or more types of modification is to comprise one or more of: power-gating of the one or more subsystems or disabling of co-issue.

20. The system of claim 19, wherein the logic to analyze the first frame of the scene is to gather information and compute state transition probabilities corresponding to the first frame.

21. The system of claim 19, further comprising logic to determine whether to abort execution of the one or more operations in response to a drop in correlation of a present frame of the scene to a previous frame of the scene.

22. The system of claim 19, wherein the one or more types of modification is to comprise one or more of: an operating frequency change, the power-gating of the one or more subsystems, or the disabling of co-issue.

23. The system of claim 19, wherein the logic to execute is to execute the one or more operations on a subsequent frame, following the third frame, of the scene.

24. The system of claim 19, wherein the one or more subsystems are selected from one or more of: Graphics Transmission Interface (GTI), one or more Fixed Functions, Slice Common (SC) front end, SC back end, Third Level cache, one or more Samplers, or Half-slice Data Cluster plus Front End of the Data Port.

25. The system of claim 19, wherein the one or more subsystems are to include one or more Execution Units.

26. A non-transitory computer-readable medium comprising one or more instructions that when executed on a processor configure the processor to perform one or more operations to:
analyze a first frame of a scene;
determine whether to perform one or more operations on one or more frames of the scene, based on a second frame of the scene and an idle status of one or more subsystems of the processor;
execute the one or more operations on a third frame of the scene based on the determination of whether to perform the one or more operations; and
determine which drawcalls receive one or more types of modification, wherein the one or more types of modification is to comprise one or more of: power-gating of the one or more subsystems or disabling of co-issue.

27. The non-transitory computer-readable medium of claim 26, further comprising one or more instructions that when executed on a processor configure the processor to perform one or more operations to gather information and compute state transition probabilities corresponding to the first frame.

28. The non-transitory computer-readable medium of claim 26, further comprising one or more instructions that when executed on a processor configure the processor to perform one or more operations to determine whether to abort execution of the one or more operations in response to a drop in correlation of a present frame of the scene to a previous frame of the scene.

* * * * *